R. L. WRIGHT.
Bending Wagon Tires.
No. 10,970.
Patented May 23, 1854.
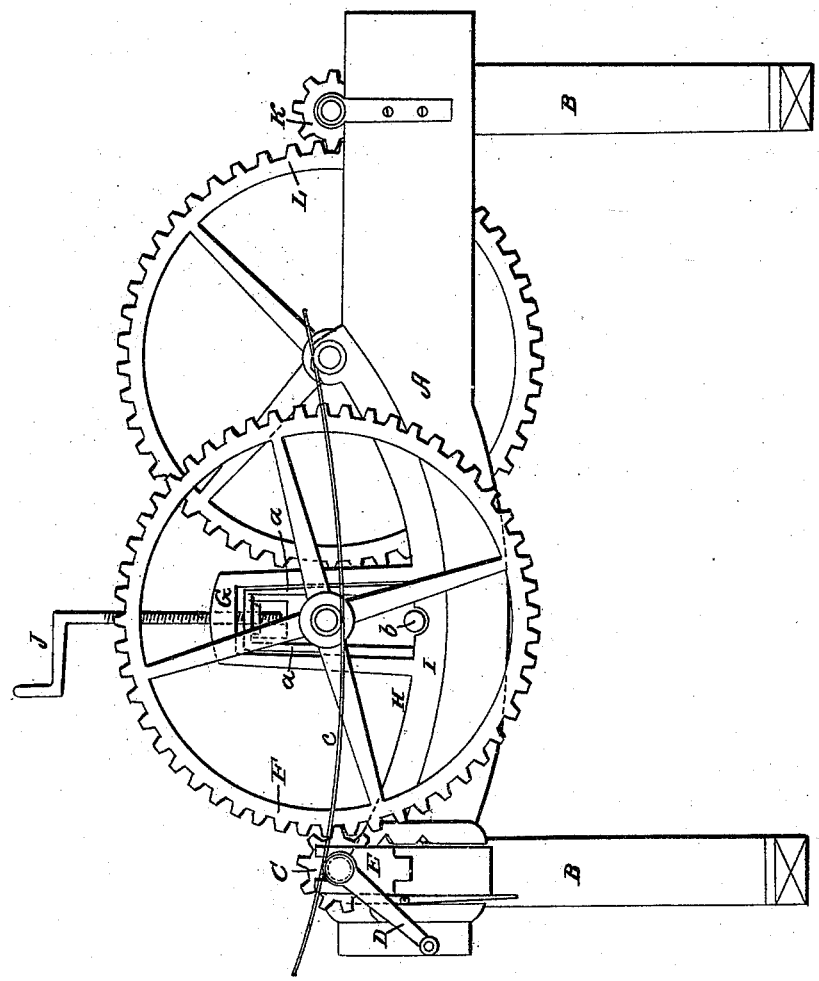

UNITED STATES PATENT OFFICE.

ROBERT L. WRIGHT, OF BLUE ROCK, PENNSYLVANIA.

TIRE-BENDING MACHINE.

Specification of Letters Patent No. 10,970, dated May 23, 1854.

*To all whom it may concern:*

Be it known that I, ROBERT L. WRIGHT, of Blue Rock, in the county of Chester and State of Pennsylvania, have invented certain new and useful Improvements in Machines for Bending Wagon-Tire or other Circular Rims; and I do hereby declare the following to be a full, clear, and exact description of the same, reference being had to the accompanying drawings, making a part thereof, and which represent a side view of the machine.

To enable others skilled in the art to make and use my invention, I will proceed to describe the same with reference to the drawing.

The stock or bed A of the machine may be constructed of wood or iron, and supported on legs B, B. At one end of the bed is arranged a spur wheel C, on the end of a roller shaft, (in red lines) and on the extreme end of this roller shaft is arranged a crank D, by which motion may be communicated to the machine by hand or otherwise. The box E, in which the journals of the spur wheel shaft rotate, is made adjustable by means of the projections 1, 2, on one side and the wedge 3, on the other side of said box. This is for the purpose of keeping the spur wheel in gear with the cog wheel F, which rises and falls to accommodate itself to the curve of the tire or band to be bent as will be described.

G, is a pillar block (there being one on each side of the frame) in which the bearings *a* of the roller (in red lines) are placed, and on the end of this roller is arranged the cog wheel F.

There is a concave bed H in the stock, faced with metallic plates I, in which immediately under the roller which is the shaft of the gear wheel F, is placed when found necessary a roller *b*, which, as well as the roller shaft of the wheel F, may be plain or grooved for bending flat or round bars, as may be desired.

The bearings *a* within the pillar block G, are run up and down by means of a hand screw J, there being one on each side of the frame, and the gear wheel F, of course rises and falls with its bearings, and consequently the spur C which drives it must be made adjustable as before described, or else it will slip out of gear with F.

The double red line *c* represents a bar being operated upon. By turning the crank D, first in one direction and then in a contrary one, the bar is fed through by the friction of the rollers which are rotated thereby. At the same time the hand screws J, are run down, until the bar has its proper curvature, or is bent into a hoop or circle of any size within the capacity of the concavity in the bed.

At the opposite end of the stock from the concave bed may be placed another spur gear K, meshing with a large gear wheel L, and this in turn may work into a spur gear on the roller *b*, for the purpose of giving it motion, as well as the roller above it. This however will only be found necessary when bending very heavy bars, or when giving other shape to them than mere curvature, for as before stated various forms of rolls may be used either plain or grooved.

The object of the machine is more especially for the use of shops where there is no other than hand power, and where it is necessary sometimes to do very heavy work.

Having thus fully described the nature of my invention what I claim therein as new and desire to secure by Letters Patent is—

The arrangement of the adjustable spur wheel, with the rising and falling roller shaft of the wheel F, and the concave bed, for the purpose of bending tire of variable sizes in the same machine as set forth.

ROBERT L. WRIGHT.

Witnesses:
 THOS. K. BULL,
 LEVI B. HUGHS.